Patented Oct. 28, 1952

2,615,859

UNITED STATES PATENT OFFICE 2,615,859

POLYVINYL CHLORIDE PLASTICIZED WITH A CHLOROALKYLCHLOROBENZENE COMPOUND

André Gislon, Paris, France, assignor to Compagnie Francaise de Raffinage (Societe Anonyme), Paris, France No Drawing. Application March 7, 1947, Serial No. 733,189. In France February 20, 1946

Section 1, Public Law 690, August 8, 1946
Patent expires February 20, 1966

3 Claims. (Cl. 260—33.8)

I have found that aromatic components substituted by aliphatic and halogenated chains on the nucleus and/or on the side chain or chains form valuable plasticizers chiefly adapted for use in the treatment of polyvinyl chlorides.

Hereinafter are given two examples of the manner in which such compounds may be prepared, it being understood that the present invention is not limited to the details set forth in these examples.

Example 1

A gas oil of aliphatic nature, chlorinated at 30%, is condensed with benzene by any usual method. In addition to viscous products adapted to be used as lubricants, the condensation reaction produces as by-products aromatic compounds alkylated by means of aliphatic chains. The latter compounds, separated through distillation, are submitted to chlorination, preferably in a medium of carbon tetrachloride without any catalyst or alternatively in the presence of 1% of anhydrous ferric chloride as a catalyst or else alternately in presence of a catalyst and without such a catalyst. The total chlorine content is raised at 40% and the reaction product is used as a plasticizer either as such or after rectification.

Example 2

An excess of monochlorobenzene is condensed in presence of aluminum chloride with a fraction of Fischer's gas oil the boiling point of which under a pressure of 25 mm. of mercury ranges from 80 to 167° C., said oil having a mean molecular weight equal to 225 and being chlorinated at 30% (the excess of chlorobenzene corresponding to about 12 moles of said product in the mixture as against one mole of chlorinated gas oil). After condensation, which results in the removal of all of the chlorine bound to the aliphatic hydrocarbon chain, the sludges are separated from the aluminum compound after which the product is washed with water and the excess of monochlorobenzene is distilled off.

The compound obtained is then rectified in vacuo and the fraction the boiling point of which under a pressure of 20 mm. of mercury ranges from 200 to 250° C. is then overchlorinated in presence or not of a diluting medium and in the absence of any catalyst until it shows a total content of 38% of chlorine.

The chloroalkylchlorobenzene thus prepared may be used as a plasticizer either as it is or after rectification.

It has been compared with tricresylphosphate in three operations A—B—C, the results of which are shown in the following table.

|  | A | B | C |
|---|---|---|---|
| Polyvinyl chloride, percent | 60 | 60 | 60 |
| Tricresylphosphate, percent | 40 | 0 | 20 |
| Chloroalkylchlorobenzene, percent | 0 | 40 | 20 |
| Tensile strength, kg./mm.² | 0.88 | 1.28 | 1.26 |
| Elongation, percent | 269 | 300 | 310 |
| Shore hardness at 25° C | 73 | 78 | 80 |
| Shore hardness at 80° C | 56 | 55 | 55 |

What I claim is:

1. A plasticized product comprising a vinyl chloride polymer and a plasticizer which is a chloralkylchlorobenzene compound, said compound being made by condensing aliphatic gas oil which contains about 30% chlorine with a compound selected from the group consisting of benzene and monochlorobenzene and thereupon chlorinating the resulting condensation product to about 40% chlorine content.

2. A plasticized product comprising a vinyl chloride polymer and a plasticizer which is a chloralkylchlorobenzene compound, said compound being made by condensing aliphatic gas oil which contains about 30% chlorine with benzene and thereupon chlorinating the resulting condensation product to about 40% chlorine content.

3. A plasticized product comprising a vinyl chloride polymer and a plasticizer which is a chloralkylchlorobenzene compound, said compound being made by: (a) chlorinating to about 30% chlorine content a fraction of Fischer gas oil, said fraction having a boiling range of between about 80° and 167° C. at 25 mm. Hg pressure and also having an average molecular weight of substantially 225; (b) condensing said chlorinated fraction of Fischer gas oil with monochlorobenzene and; (c) chlorinating the resulting condensation product to about 40% chlorine content to yield said compound.

ANDRÉ GISLON.

REFERENCES CITED

The following references are of record in the file of this patent:

UNITED STATES PATENTS

| Number | Name | Date |
|---|---|---|
| 2,052,000 | Oschatz | Aug. 25, 1936 |
| 2,273,467 | Dreisbach | Feb. 17, 1942 |
| 2,460,376 | Caprio | Feb. 1, 1949 |